John Gibson Jr., Albany, N.Y.
Improvement in Saucers, Dishes, and similar Vessels, for holding a second or upper Vessel.
117766
Patented Aug 8 1871
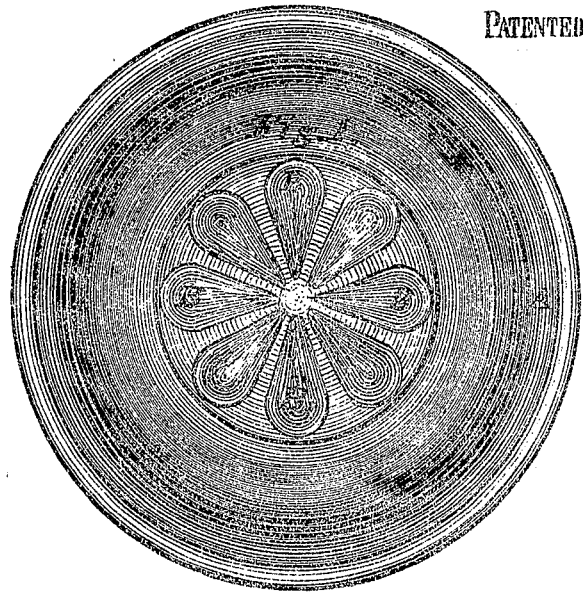
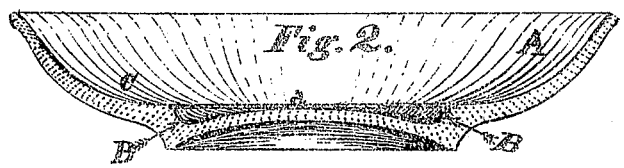
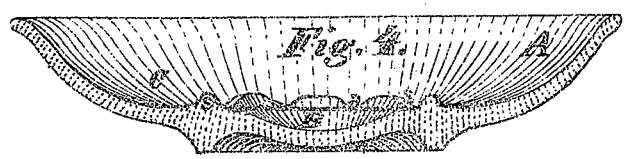
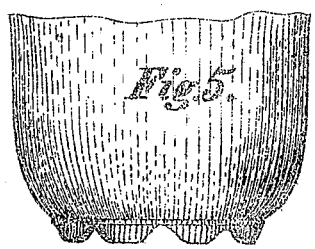
Witnesses.
J. P. Jones
J. Harper Gibson
Inventor
John Gibson Jr

UNITED STATES PATENT OFFICE.

JOHN GIBSON, JR., OF ALBANY, NEW YORK.

IMPROVEMENT IN SAUCERS, DISHES, &c.

Specification forming part of Letters Patent No. 117,766, dated August 8, 1871.

*To all whom it may concern:*

Be it known that I, JOHN GIBSON, Jr., of the city and county of Albany, State of New York, have invented certain new and useful improvements in vessels intended to contain an upper or second vessel, such as saucers and the like; and I do hereby declare that the following is a description thereof, reference being had to the accompanying drawing forming a part of this specification, in which—

Figure 1 represents a vertical view of a saucer from above, embodying my invention. Fig. 2 is a side elevation of the same. Figs. 3 and 4 are side elevations of saucers, illustrating other modifications of this invention. Fig. 5 represents a side view of section of a cup, illustrating a mode of construction of the same to effect results similar (though in a limited degree) to the improvements illustrated in Figs. 1, 2, 3, and 4.

My invention relates to saucers and similar vessels used to contain a second and upper vessel, placed therein to hold liquids; and consists in making in the upper surface of the said saucer or similar vessel cavities or recesses, or sunken surfaces, which will be below the plane on which the second or upper vessel is intended to stand, and which cavities will be capable of receiving the ordinary drip or slop of liquid from an upper vessel when placed on or in said saucer or lower vessel; the object of this invention being to provide for the reception of the ordinary drip or waste liquid that may fall from such upper vessel in the recesses or depressions formed in said lower vessel, and thereby keep the bottom or base of the second or upper vessel, when placed in said saucer or lower vessel, above the waste liquid, and from contact therewith, so that when the upper vessel is lifted out of the saucer or lower vessel it will not by adhesion carry with it the said waste liquid, dripping the same, and thus endanger the soiling or staining of garments and table-cloths or other articles, as is now common with saucers and dishes of the usual construction.

To enable others skilled in the art to make and use my invention, I will proceed to describe it in reference to the drawing and the letters of reference marked thereon, the same letters indicating like or equivalent parts.

In the drawing, A represents a saucer or similar vessel constructed of delf, porcelain, China, stone-ware, or other suitable material, and of any desired style or pattern. B B B, Figs. 1, 2, and 4, represent cavities or recesses made in the face or upper surface of the bottom of the vessel, which cavities or recesses are sunken below the usual plane $a$ on which the second or upper vessel (to be used with the saucer or lower vessel) is to stand. The said recesses B B B may be one or more in number, as in Figs. 1, 2, and 4, or of any desired form, size, or position, as the use, style, or fashion of the vessel might demand. When on a saucer or lower vessel a raised rim, S, is made, as in Figs. 3 and 4, to hold central therein a second or upper vessel; I would make the said rim S broken or more or less notched, as shown, for the purpose of allowing the drip or slop from an upper vessel to flow past said rim S into any lower depression or pocket. If desired, the cavity $C'$ of the vessel A may be sunken below the central plane $a$ on which the upper vessel is to stand, and be continued around the said central plane unbroken, as shown in Fig. 3; or a series of two or more depressions may be used in the place of said continuous cavity $C'$, to any or all of which may be given an ornamental form.

The improvements embraced in this invention are applicable to all lower vessels, such as saucers for tea and coffee-cups, wash-bowls, or dishes for water-pitchers, drip-dishes for sirup-cups, or any other lower vessel designed for holding an upper vessel, and give opportunity for a variety of patterns and styles more or less ornamental. By means of the said cavities or recesses or other equivalent depressed surfaces sunken below the central plane $a$, as described, the ordinary drip or waste liquid received by the lower vessel A would flow off or away from the base of an upper vessel when placed therein, and such waste liquid would not have contact with or adhere to the base of such upper vessel when lifted, and all danger of dripping on garments or table-cloth would be avoided while lifting the upper vessel out of the lower saucer or vessel A.

Having described my invention, what I claim, and desire to secure by Letters Patent, is—

In saucers and others vessels for containing an upper vessel, the recesses or pockets B B, cavities $C'$ or equivalent depressions, when sunken below the central or supporting plane $a$, substantially in the manner set forth, for the purpose specified.

JOHN GIBSON, JR.

Witnesses:
 J. P. JONES,
 J. HARPER GIBSON.